Oct. 6, 1970  K. ENSLEIN ET AL  3,532,863

DYNAMIC CAM TESTER

Filed Sept. 13, 1967  7 Sheets-Sheet 1

FIG. 1

INVENTORS
KURT ENSLEIN
JOHN L. REMINGTON
BY RAYMOND C. WILSON

ATTORNEYS

INVENTORS
KURT ENSLEIN
JOHN L. REMINGTON
BY RAYMOND C. WILSON
ATTORNEYS

FIG. 8

United States Patent Office 3,532,863
Patented Oct. 6, 1970

3,532,863
DYNAMIC CAM TESTER
Kurt Enslein and Raymond C. Wilson, Rochester, and John L. Remington, Penfield, N.Y., assignors to Xerox Corporation, Rochester, N.Y., a corporation of New York
Filed Sept. 13, 1967, Ser. No. 667,495
Int. Cl. G01b 5/20; G06f 15/46
U.S. Cl. 235—151.3        5 Claims

ABSTRACT OF THE DISCLOSURE

An apparatus for evaluating the output of a cam surface in relation to its velocity, acceleration and jerk characteristics by utilizing sensing and measuring devices, a data storage device, a computer and logic circuitry arranged so that signals, indicative of the camming conditions of the cam surface, may be stored and compared with reference conditions are determinations of output characteristics.

This invention relates to apparatus for testing the characteristics of an object profile and, in particular, apparatus for measuring and evaluating the output of a cam system.

More specifically, this invention relates to apparatus for rapidly measuring and evaluating the velocity, acceleration, and jerk produced by an object profile system. An object profile or cam is a direct-contact machine element which is shaped or formed to impart a prescribed motion to a cam follower or the like. Ordinarily, the motion of the cam and the cam follower can be arbitrarily chosen and the cam profile made to fit the desired conditions. However, as the mechanisms controlled by cam systems become more and more sophisticated, a cam profile, and the motion imparted thereby, is exactingly dictated by design requirements. In some cases the output motion produced by such a cam system becomes critical to a point where conventional static testing means, because of their crudeness, are not adequate to give an accurate indication of the systems behavior. Although the profile of the cam face may be statically within prescribed limits, the resultant behavior of the whole system, because of the relationship between the forces and the motions involved, is such as to cause system inaccuracies.

It is therefore a primary object of this invention to provide apparatus for accurately testing a cam system.

Another object of this invention is to provide apparatus for measuring the output of a cam system.

A still further object of this invention is to determine the accuracy of an object profile by evaluating the output of the system.

Yet another object of this invention is to improve apparatus for rapidly and accurately evaluating the performance of a cam prior to its placement in a machine system.

These and other objects of the present invention are attained by an input spindle for supporting and rotating an object profile therein, an output spindle arranged to support a cam follower in working cooperation with the object profile supported in the input spindle, detecting means associated with both the input and output spindle for detecting the displacement of the cam and cam follower, and logic circuit means for noting and storing the displacement of the output cam follower in response to various positions of the cam profile. The stored data is then passed to a computer where it is evaluated to determine if the output of the cam system is within prescribed tolerances.

For a better understanding of this invention as well as other objects and further features thereof, reference is had to the following detailed description of the invention to be read in connection with the accompanying drawings, wherein:

For illustrative purposes, the apparatus of the present invention will be described in reference to testing a disc-type cam used to control an oscillating follower. The measurements of primary interest in this type of system are angular velocity, acceleration, and jerk of the follower as it traces the path described by the cam profile. It should be clear, however, that the apparatus disclosed herein is not restricted to this particular application and it is entirely possible to substitute linear detecting and measuring means for the angular ones herein employed thereby making it possible to test cam systems of various designs with little or no difficulty.

Figure 1:
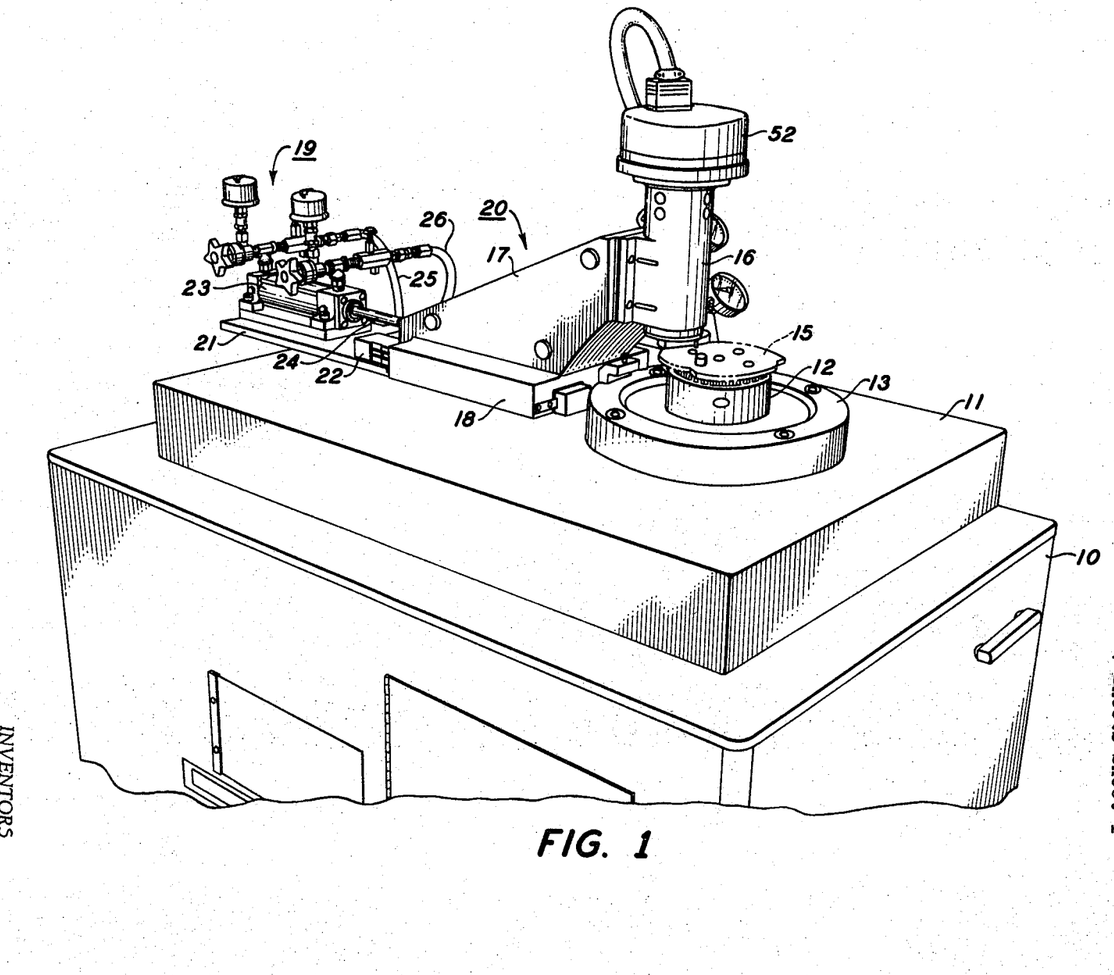
FIG. 1 is a perspective view of a dynamic cam testing apparatus embodying the invention.
Figure 2:
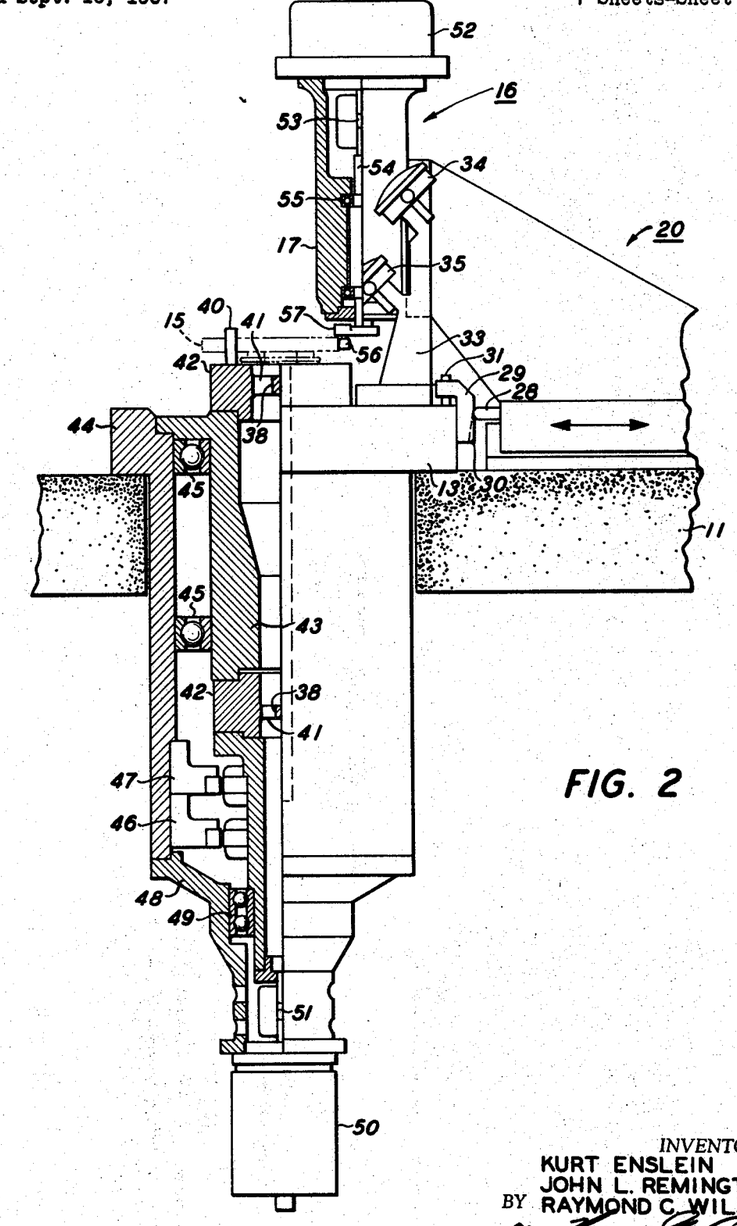
FIG. 2 is a side elevation showing, partly in section, the input and output spindles of the invention in a working position.

The system is basically a data acquisition system for supplying information to a computer, the information being analyzed and evaluated in the computer to determine if the test subject is within described limits. As shown in FIGS. 1 and 2, a disc-type cam is accurately mounted in an input spindle and the spindle rotated. The angular displacement of the rotating input spindle is electro-optically monitored by input encoder means. Similarly, a cam follower is mounted in an output spindle and the spindle arranged so that the cam follower is displaced in response to the rotating disc-type cam. Electro-optical output encoder means sense the changes in displacement of the cam follower as the position of the cam changes. Logic circuitry causes this information from the output shaft encoder to be fed through a memory buffer to an incremental tape recorder. The collected data is then fed to a digital computer where it is evaluated.

In this arrangement the data acquisition hardware is isolated from the computer equipment thereby giving the apparatus a wide flexibility as well as holding the hardware to a minimum level of complexity. However, with this apparatus it is quite feasible, and desirable in many cases, to process data directly to the computer and have an answer returned in a relatively short time.

A perspective view of the mechanical fixture of the cam testing apparatus is shown in FIG. 1. Basically machine frame 10 supports a granite surface plate in a manner so that the working surface of the granite plate 11 is in a horizontal plane. The mechanical fixture is supported upon adjustable isolators (not shown) capable of dampening out unwanted vibrations and providing a means of leveling the working surface of the granite plate. The level surface of the plate is used as a base surface upon which input and output spindles 12 and 16, respectively, are located.

Input spindle 12 is held in a stationary position by securing collar 13 to the granite plate. The main portion of the spindle is carried internal the machine fixture in the aperture provided in the granite bed (FIG. 2). The input spindle is adapted to rotatably support work piece 15 accurately in a fixed position. As can be seen, the granite bed provides a reference plane from which all of the essential mechanical components are located in reference to each other. The output spindle 16 is slidably mounted so that it can be moved in and out of working contact with a work piece thereby facilitating cam loading and unloading. The output spindle is affixed to a support frame 17 which, in turn, is securely held to movable platform 18 to form what is herein referred to as slide assembly 20. Slide 20 moves in a horizontal direction along precision ground rails 22 mounted on base plate 21.

A velocity controlled pneumatic drive system 19 moves the output spindle and associated cam follower in and out of engagement with a test cam. Double acting pneumatic cylinder 23, acting through piston rod 24, extends or retracts the slide assembly in response to the positioning of a hydraulic valve (not shown). Selective positioning of the hydraulic valve causes fluid to be introduced through either lines 25 or 26, respectively. Introduction of fluid through line 25 causes the slide to be extended toward the test cam while introduction of fluid into the cylinder through line 26 causes it to retract.

The output spindle is shown extended in the working position in FIG. 2. In operation, the velocity controlled pneumatic system drives slide 20 toward the input spindle. The slide continues to drive forward until it is physically arrested by a stopping means. The slide is provided with a pad 28 adapted to engage stop 29. The stop is slidably mounted in collar 13 of the input spindle so that it is free to move in a vertical plane along tapered surface 30 mounted on collar 13. Adjusting the stop in a vertical plane by means of set screw 31 governs the horizontal travel of the slide and thus permits accurate adjustment of the output spindle.

The horizontal and vertical relationship of the two spindles, when placed in a working condition, is visually checked by means of dial indicator gages 34 and 35, respectively. The gages are mounted on a support column 33 which is affixed to the mounting collar 13 of stationary input spindle 12. The actuators of the indicator are arranged to sense the position of machine surfaces provided on the input spindle. Any misalignment of the spindle in the working position, horizontally or vertically, can be visually detected.

As shown in this specific embodiment of the present invention, the work piece to be tested comprises a cam 15 mounted on a shaft. The work piece is inserted into input spindle 12 so that a timing hole machined in the cam member engages locating pin 40. The input spindle is fitted with a pair of hydraulic chucks 42 capable of contracting into engagement with the cam shaft. The hydraulic chucks contracting action is accomplished by means of hydraulic pressure uniformly distributed behind a section of a steel sleeve 41 which grip the shaft upon machine bearing surfaces 38 provided. Contraction of the sleeve is held within the elastic limits of the metal so that the sleeves will return to their original posture when the holding pressure is released. The gripping action is complete throughout the area of contact between the contacting areas of the sleeve and the shaft so that any slight variation in shaft size or other irregularities will not prevent firm gripping and accurate centering of the shaft. That is, secure holding and excellent centering is a natural result of the hydraulic action of the chuck due to the radial and concentric forces exerted thereby. Hydraulic chucks similar to those herein described are manufactured by the A. C. Engineering Corporation of Warren, Mich., under tre trade name "Hydrolock."

The hydraulic locking devices are accurately mounted in a rotatable housing 43 which is journaled for rotation in stationary housing 44 by means of two superhigh precision instrument ball bearings 45. As previously noted, the stationary housing is permanently affixed to granite surface plate 11 (FIG. 1). The stators of torque motor 46 and a tach generator 47 are permanently mounted in the stationary housing and are electrically coupled to rotatable housing 43 (FIG. 2).

Figure 5:
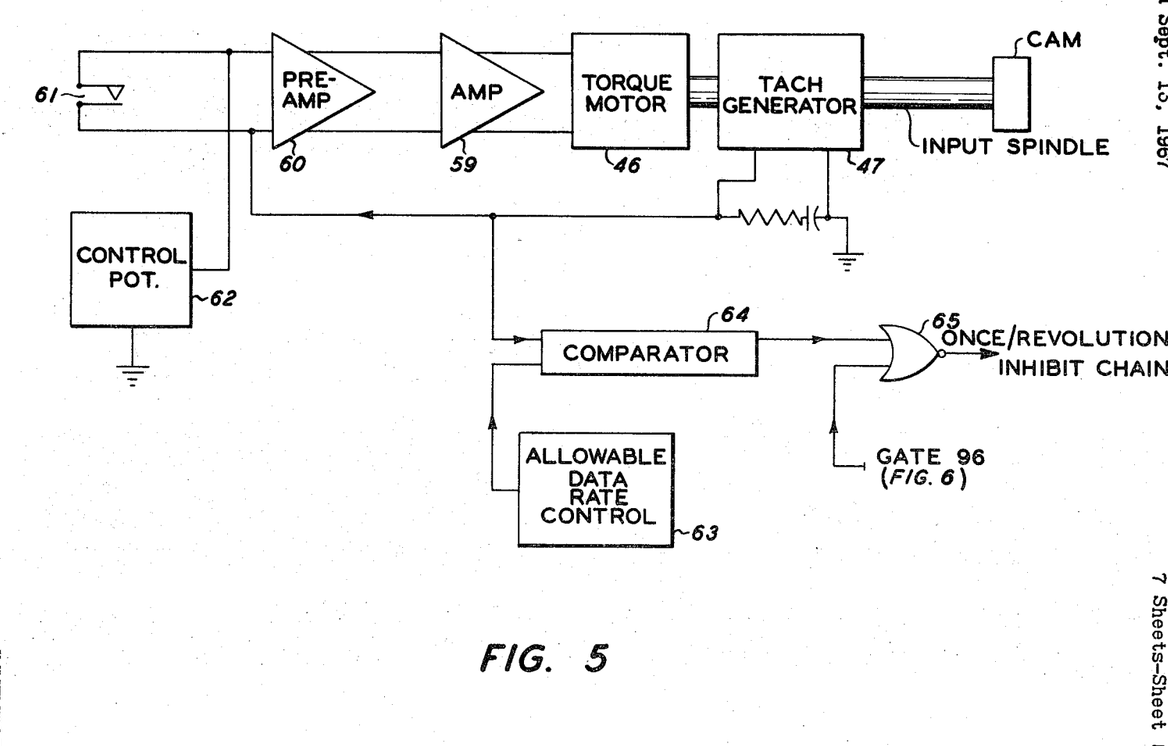
FIG. 5 is a diagram of the apparatus motor control system.

The torque motor and tach generator make up part of the system's drive unit which is shown in FIG. 5. Referring now to FIG. 5, torque motor 46 is coupled to the input spindle and supplies the driving power required. Also coupled to the spindle is tach generator 47 which is arranged to measure the angular velocity of the spindle as it is being driven by motor 46. Electrical power to the torque motor is provided by power amplifier 59 which, in turn, is driven by a preamplifier 60. The preamplifier electrical input consists of the tach generator output and a reference voltage obtained from the motor speed control potentiometer 62. The system is arranged as a negative feedback loop so that the amplifier will supply that degree of power to the torque motor necessary to drive the input spindle at the speed required so that the tachometer output equals, within a very small error, the reference voltage.

It should be noted that the output of the tach generator is also fed into a voltage comparator 64 where the output voltage is compared to the maximum allowable output selected in unit 63. When the voltage of the tach generator is within limits the comparator produces an output signal indicating that the systems velocity is acceptable. However, if the velocity of the input spindle is excessive, AND gate 65 is not enabled and further operation of the once per revolution logic system, which will be described in further detail below, is inhibited.

In order to stop the motor drive, the output terminals of the preamplifier are shorted together by means of contacts 61, the closure of which are controlled by a flip-flop circuit in the logic control system. When the two terminals of the preamplifier are at the same potential, i.e. shorted together, the system is made to believe that it is moving at the desired velocity and therefore ceases operation.

Referring once again to FIG. 2, input shaft encoder 50 is shown flange-mounted to bell-shaped casting 48 which is affixed to the bottom portion of stationary housing 44. The rotatable housing 43 is also rotatably mounted in the bell-shaped casting by means of high-precision thrust bearing 49. The coupling between the input shaft encoder and rotatable housing 43 is achieved by means of a high precision coupling 51. Similarly output shaft encoder 52, which is mounted on support frame 17, is coupled to the output shaft 54 by means of high-precision flexible coupling 53. The output shaft 58 is rotatably mounted in the support frame by two super precision roller bearings 55. The output shaft 54 communicates with a barrel type cam follower 56 through means of arm 57, so that any angular displacement of the cam follower is immediately sensed by the input shaft encoder.

Basically the apparatus of the present invention comprises a data acquisition section capable of obtaining and storing cam test data on tape and computer means for accepting the stored data and evaluating the same to determine if the cam tested is within the desired specific parameters. For illustrative purposes, the invention is explained in reference to a tape format based on the assumption that there will be 1080 test samples taken for each cam tested. The logic system causes three identification words to be written at the beginning of each test run. After the three identification words have been written, an interrecord gap (IRG) is recorded which is followed by a series of data words; a complete set of 1080 data words comprising what is herein referred to as a data record. After each data record another interrecord gap (IRG) is written. Therefore, for each individual cam tested, the incremental tape recorder will write three identification words followed by an IRG and a data record followed by a final IRG. Circuitry is provided by which the operator may choose to repeat a test on the same cam or perform a test on a new test subject. In the event that a repeat test is selected, the logic circuitry is caused to bypass the identification word circuitry and a second data run written. If however, the operator chooses to test a new cam, three identification words related to this cam are written followed by an IRG, the data record, and a final IRG. Data records of either type continue to be written in the manner described until such time as the operator chooses to terminate the run. As will be described below, when an end-of-tape condition is reached, a terminal identification record is placed on tape and a final IRG written.

The incremental tape recorder sub-system consists of two sub-units; a tape transport and an electronics control package. This particular incremental tape recorder, commercially manufactured by Precision Instruments Corporation, was chosen because the output tape is compatible with both IBM and Control Data computers. The information is recorded on tape in BCD form and, for this particular application, recorded in the even parity mode. However, it should be clear that this selection is not restrictive and the code form and parity mode can be chosen to best suit the design requirements of the particular case. It should be further noted, that the computer need not be coupled to a tape recorder. The test data can be fed directly to the computer from a memory buffer or the like. The incremental tape recorder only acts as a means of conveniently isolating the data acquisition section of the present apparatus from the computer means thereby giving the apparatus a wide flexibility. It is found that by using this combination the apparatus is able to handle changes in evaluation requirements with relative ease while keeping the data acquisition hardware at a minimum level of complexity.

Figure 3:
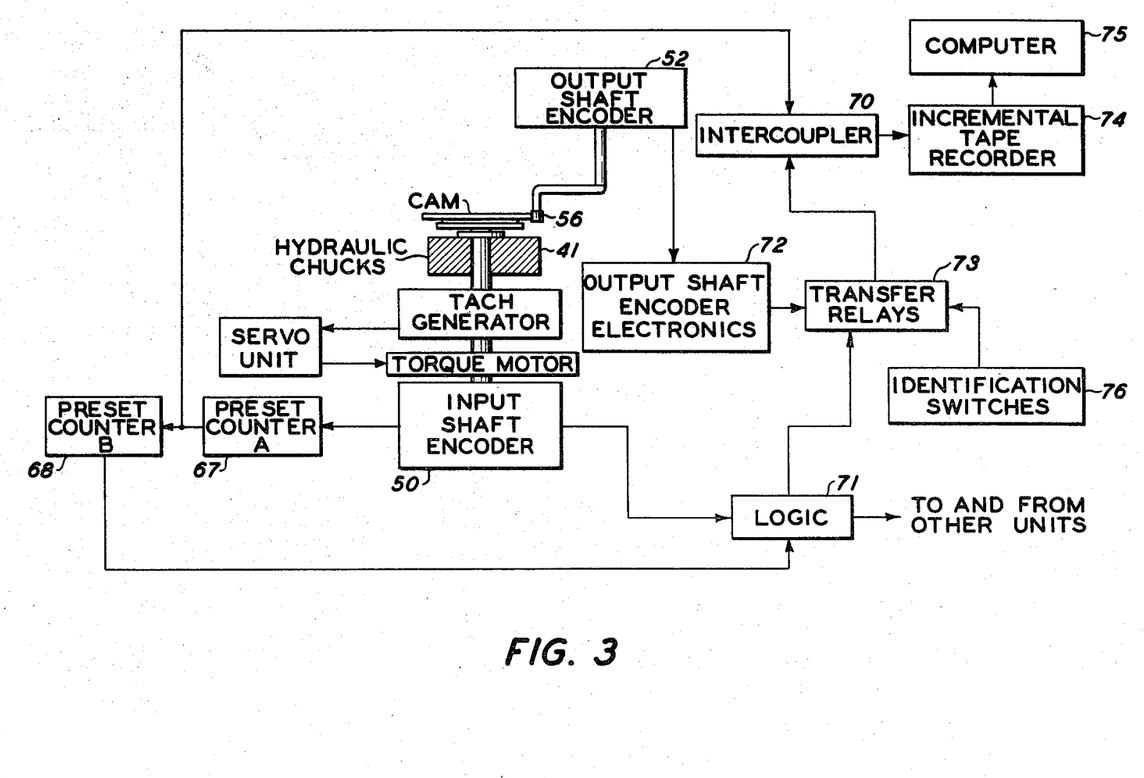
FIG. 3 is a block diagram of the machine components embodying the apparatus of the invention.
Figure 6:
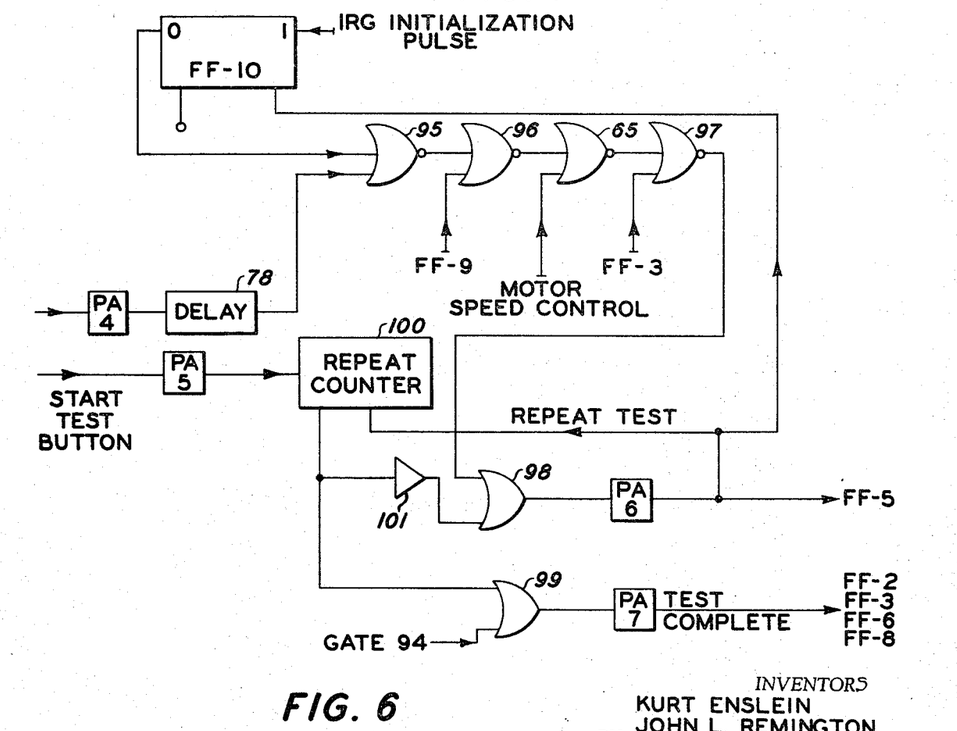
FIG. 6 is a diagram of the apparatus once per revolution logic control chain and repeat counter circuitry.
Figure 7:
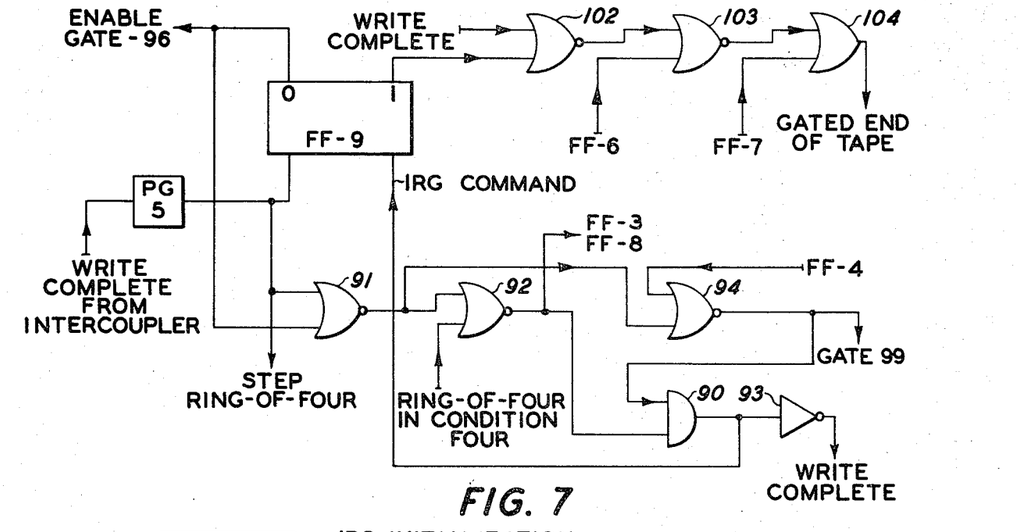
FIG. 7 is a diagram of the apparatus interrecord gap logic control sub-system.
Figure 8:
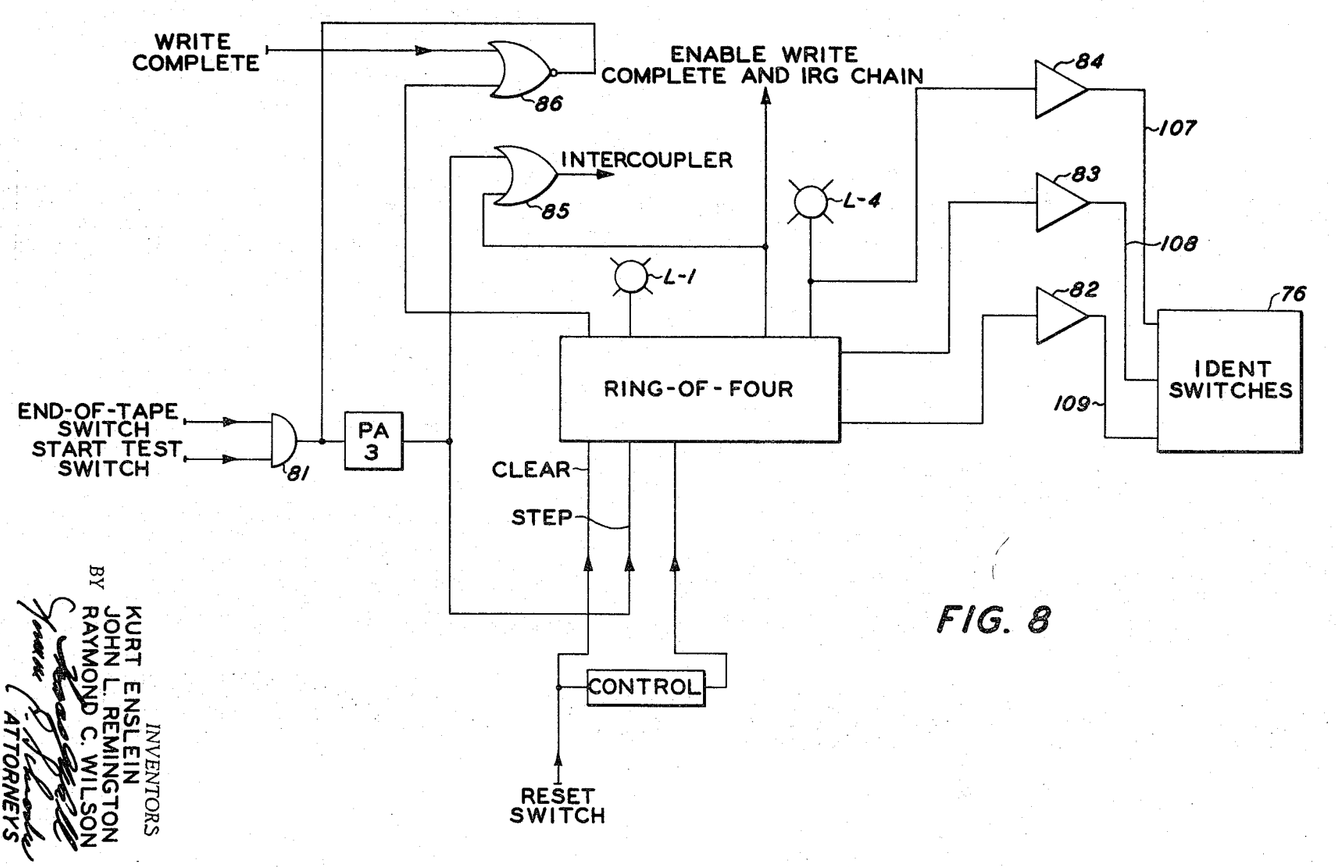
FIG. 8 is an electrical schematic diagram of the identification word logic control circuitry.

So that a better understanding of the present apparatus can be had, the operations will be further explained in reference to the electrical diagrams shown in FIGS. 3 through 8. Assuming that a test cam has been properly mounted in the precision chucks and the slide assembly extending to a working position, electrical power is supplied to the systems drive unit (FIG. 5) causing the input spindle to turn at a predetermined constant velocity. The first action of the system will be to write three identification words on tape. The identification words consist of five BCD characters stored in appropriate switches located on the systems control panel and referred to numerically as 76 (FIG. 3). These switches have the function of setting up identification words which carry the date, cam number, vendor number, and operator number. These switches consist of BCD units operating in the 8, 4, 2, 1 mode, with 0's represented by the 8-2 code. A bank of switches representing a word have their commons wired together so that only three command leads are required. These command leads are shown in FIG. 8 and numerically referred to as 107, 108, and 109, respectively. A standard diode-resistance network is used to decouple the various switches from one another.

As shown in the block diagram in FIG. 3, the identification words are sent through transfer relays 73 to intercoupler 70. The intercoupler, acting as a memory buffer, then passes the identification words to the incremental recorder 74 where they are stored on tape.

Transfer relays 73 are actuated from the logic system 71 and have the function of transferring the source of the data for the intercoupler from the identification switches to the output shaft encoder electronics 72. Only four relays are required because of the method used to code the identification word.

After the three identification words have been written on tape, an interrecord gap (IRG) is written, the method of which will be explained below. The system now waits for an index signal from the input shaft encoder 50 (FIG. 3). Input shaft encoder 50 is of the incremental type having a resolution of 32,400 bits of information per revolution. In addition to the incremental track, the input shaft encoder has a second indicator track capable of generating a single pulse for each revolution of the shaft. This single pulse is used as an index pulse by the logic system and will herein be referred to as the "once per revolution pulse." The index pulse is related to locating pin 40 (FIG. 2) in such a way that a pulse is propagated in reference to a given point on the cam profile; the point being the termination of a rise or retrace section.

As shown in FIG. 3, the one per revolution pulse is sent to logic circuitry 71 where it is used as a reference signal in the controlling and sequencing of operation in the cam testing apparatus. It should be noted, input encoder 50 need not have direction sensing ability and therefore can be rotated in either direction. Encoders similar to the one herein described are commercially available through Sequential Electronics Systems Inc. of Elmsford, N.Y.

Data from the input shaft encoder incremental track (32,400 bits) is sent to a duplex preset counter network consisting of preset counter A and preset counter B referred to herein numerically as 67 and 68 respectively. Preset counter A is a two decimal digit counter while preset counter B is a four decimal digit counter. The counters are such that when a desired count is reached the counters will automatically produce an output pulse, reset themselves, and once again begin a new counting sequence. Each individual counter is provided with input facilities for setting and enabling the counter by means of a contact closure having at least 20 milliseconds duration. As will be seen later, a separate contact closure for each counter is required so that the counters can be enabled individually. The counters are placed in tandem so that an output pulse from preset counter A increments preset counter B. At the same time counter B is incremented, a signal is also sent to the intercoupler 70 asking it to examine the output from output shaft encoder 52. Preset counter B continues to count until it reaches the preset count at which time it tells the logic circuitry that the input shaft encoder has rotated through the required amount of arc. The logic system uses this data to determine the next sequence of operations.

Referring once again to FIG. 3, cam follower 56 communicates with output shaft encoder 52 by means of a shaft and arm arrangement as previously explained. The encoder is capable of sensing instantaneously any change in the cam follower's angular displacement. The output shaft encoder, acting in conjunction with the associated output shaft encoder electronics 72, is adapted to emit a binary coded signal representative of the output shaft's position. The output shaft encoder is a high resolution, whole word, cyclic binary encoder having a resolution of $2^{19}$ bits per revolution. As can be seen, the output encoder system must be capable of emitting a coded pulse in a relatively short period of time because of this extremely high resolution. The coded pulse is first sent to the output shaft electronics 72 and then to the intercoupler 70 as a whole data word. Because of the extremely high resolution of this system, the coded pulse present in the output shaft electronics is prevented from changing for a period of time sufficient to allow the whole data word to be sent to the intercoupler, that is, the output shaft electronics is prevented from accepting subsequent coded pulses from the output shaft encoder until such time as the whole data word can be transferred to the intercoupler. The output shaft encoder 52 and the output shaft electronics 72 are commercially available through the Wayne-George Corporation of Newton, Mass.

It should be noted, it is entirely possible to substitute a linear encoder for the rotary encoder herein described thereby enabling the present apparatus to measure cam profiles directly in linear measurements.

Assuming that the identification words have been written on tape and the transfer relays are in a condition to receive information from the output shaft encoder electronics, the logic system waits for the occurrence of a once per revolution pulse. The occurrence of this index pulse causes preset counter A to begin counting. Preset counter A continues to count until coincidence is reached at which time a signal is sent to the intercoupler asking it to note the instantaneous position of the output shaft encoder which is frozen in the electronics unit 72. The intercoupler then accepts the BCD coded data through the transfer relays and sends it on to the tape recorder. Each such recording is referred to as a data sample.

The intercoupler 70 (FIG. 3) is a memory buffer having the function of accepting the data from the transfer relays, storing it in parallel, and delivering it sequentially, one character at a time to the tape recorder. In addition, the intercoupler has the further function of controlling the tape recorder and providing certain interlocking functions which will be explained below.

At the same time the preset counter A sends a pulse to the intercoupler, it also sends an incrementing pulse to preset counter B. Preset counter B continues to count the number of samples taken until it reaches the preset count at which time it tells the logic circuitry that 32,400 bits (the resolution of the selected encoder) of data have been sensed by the input shaft encoder. As can be seen, any two and four digit arrangement having a product of 32,400 can be selected with this particular arrangement. That is, if samples are to be recorded over one full revolution of the cam, the product of the settings of preset counters A and B must be equal to 32,400. For explanatory reasons, preset counter A is set for 30 counts and preset counter B set for 1,080 counts. However, it should be obvious, that this arrangement can be varied as the needs of any particular cam test vary.

Fundamentally, the logic control system 71 (FIG. 3) consists of a set of 10 flip-flops capable of performing the basic control and sequencing functions required. The operation of this logic circuitry will be explained in conjunction with the flip-flop circuit (FIG. 4) and of various control circuits associated therewith.

Figure 4:
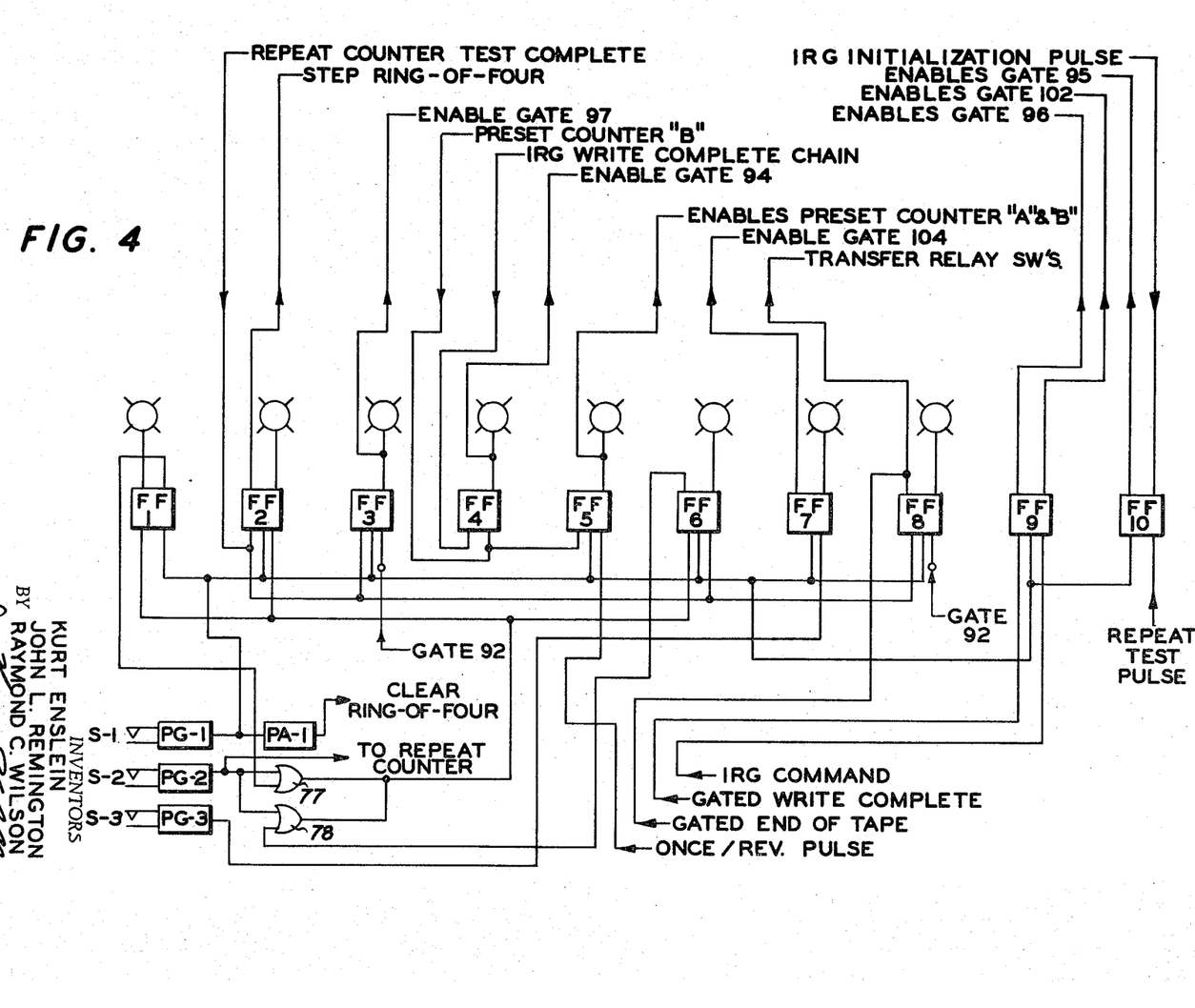
FIG. 4 is a schematic electrical diagram of the apparatus logic control system.

After the motor control sub-system has been initially energized and a cam is rotating at the desired velocity, the states of the various flip-flops are undetermined. The first action is, therefore, to reset the flip-flops to a condition so that a test sequence can be started. This is done by pushing reset button S-1 (FIG. 4) energizing pulse generator PG-1. A signal is sent to the various undetermined flip-flops transferring their states to a starting condition. As can be seen in FIG. 4, pressing reset button S-1 causes FF-1 to go to the ONE state while the other flip-flops are cleared. With FF-1 in the ONE state an enabling level is sent to AND gate 77 and a "start test light" is illuminated on the main control panel.

It should be noted at this point, flip-flops FF-1 through FF-8 have associated therewith indicator lights located on the main control panel which give a visual indication of the status of the various logic sequencing operations.

With the flip-flops in a condition to begin a test, the start-test-button S-2 is depressed causing a pulse to be generated by pulse generator PG-2. The pulse so generated is propagated through the now enabled gate 77 and used to change the states of FF-1, FF-2, and to once again disable FF-6. Flip-flop FF-6, which was initially disabled by depressing the reset button is again disabled as an added precaution should the start-test button be depressed before the current test cycle has been completed. FF-2 is now in the ONE condition and the test in progress light on the control panel is illuminated.

At this time, FF-2 also sends a stepping pulse to the ring-of-four identification word control system shown in FIG. 8. The ring-of-four steps around its complete cycle causing three identification words to be written on tape. Basically the control circuitry in FIG. 8 consists of a ring-of-four step counter used to control a series of amplifiers whose output energize sequentially the identification word switches. Initially, at the time that the system reset button is depressed, a clear pulse is sent from pulse amplifier PA-1 (FIG. 4) to the ring-of-four. This clear pulse is also sent through control circuitry 80 where it is held for a short period of time to assure that the ring-of-four is clear and then used to initialize the ring-of-four to a ONE state. Initialization of the ring-of-four to the ONE state causes light L-1 to illuminate on the control panel indicating to the operator that the identification word sequence is now in progress.

As previously noted, depression of start-test button S-2 (FIG. 4) also sends a signal to OR gate 81 through FF-2. This signal is passed through OR gate 81 to pulse amplifier PA-3 which, in turn, generates a signal causing the ring-of-four to step to the next, or TWO condition. With the ring-of-four in the TWO condition, a signal is sent through amplifier 82 and used to energize the BCD diode-resistor identification word network. As previously explained, the first identification word is then passed through the intercoupler and placed in BCD form on the magnetic tape. After the first word is written on tape, a RECORD output from the intercoupler terminates and a WRITE COMPLETE signal is generated. This WRITE COMPLETE signal is permitted to pass through enabled AND gate 86. This gate remains enabled as long as the ring-of-four is sequencing through a stepping cycle, i.e., in not in the ONE state. The signal passing through gate 86 is fed to pulse amplifier PA-3 where it once again triggers another step pulse. The ring-of-four now steps to the THREE condition and a second identification word is energized through amplifier 83. This cycle continues until the third word is caused to be written by energization of amplifier 84 at which time the ring-of-four resides in the FOUR state. Gate 86 is now inhibited and no further pulses can be passed to pulse amplifier PA-3.

Each time that PA-3 sends a stepping signal to the ring-of-four, a signal is also sent to AND gate 85. Gate 85 propagates the step pulse to the intercoupler informing it that an identification word is to be written. The gate remains enabled until the ring-of-four resides in the FOUR state. The ring-of-four now steps back to the ONE state. However, before stepping back, a WRITE COMPLETE signal will be generated and an IRG written, the method of which will be explained in greater detail below. The next WRITE COMPLETE signal will be generated after this interrecord gap and presented to gate 86. However, at this time, the ring-of-four has stepped back to the ONE state and this gate is inhibited. Thus, in this manner, the stepping cycle is interrupted after the three word sequence.

The WRITE COMPLETE signal from the intercoupler is used to cause an IRG to be written on tape. However, it should be noted that a WRITE COMPLETE signal is also generated at the termination of each recording interval regardless of the source of data so recorded. Therefore, proper switching and interlocking circuitry must be provided to distinguish when an IRG is to be written. The circuitry serving this function is shown in FIG. 7.

Flip-flop FF-9 performs the interlocking function in the propagation of a WRITE COMPLETE signal. As shown in FIG. 7, FF-9, which is originally in the reset state when reset button S-1 (FIG. 4) is depressed, is turned ON with every IRG command generated and is turned OFF with every WRITE COMPLETE signal received. Since the WRITE COMPLETE signal occurs after each data word, interrecord gap, or at the end of a tape, FF-9 also sees to it that no attempt is made to initiate a data writing cycle until the previous cycle has been completed.

It will be noted in FIG. 7, that there are two main chains joining at OR gate 90 with the flip-flop performing an interlocking function. When a RECORD signal from the intercoupler is terminated, pulse generator PG-5 sends a signal to NAND gate 91 and also transfer FF-9 to the 0 state. It will be noted that when FF-9 is allowed to go to the 0 state gate 91 is enabled and the WRITE COMPLETE signal passed to the other gates in this chain.

NAND gate 92, the next gate in the chain, is enabled by the ring-of-four residing in the FOUR condition. This means that an IRG signal cannot be generated until the three identification words are written. If the conditions are met the signal passes through gate 92 to OR gate 90. Gate 90 couples the signal to amplifier 94 which, in turn, generates the heretofore mentioned interrecord gap command.

If, however, the ring-of-four has not stepped to the FOUR condition, gate 92 is bypassed and the signal from gate 91 is passed to NAND gate 94. Gate 94 is enabled from a signal from flip-flop FF–4 (FIG. 4) indicating that preset counter B has reached coincidence and the last data record sequence has been completed. If the above conditions have been reached, the signal is passed to gate 99 (FIG. 6) in the repeat counter circuitry which will be discussed in further detail below.

The signal passing through gate 94 is also sent to OR gate 90 where an IRG command is generated in the same manner as described above. As can be seen, an IRG command is sent to the tape recorder at the termination of an identification word sequence or when a data recording sequence is completed.

After a pulse passes through gate 94 it is also used to inhibit FF–4 which remains inhibited until preset counter B once again reaches coincidence.

Enabling of gate 92 also serves a second switching function in that it changes the states of flip-flops FF–3 and FF–8 after the ring-of-four has reached the FOUR condition. Thus, with the ring-of-four residing in the FOUR condition, the transfer relays will be switched to accept data from the output shaft encoder (FF–8), and enabling signal will be sent to the once per revolution inhibit chain (FF–3) and an interrecord gap will be caused to be written at the termination of the identification words (interlocking function of FF–9).

The next occurrence of the once per revolution pulse transfers FF–5 to the ONE state thereby enabling preset counters A and B. However, before the once per revolution pulse can transfer FF–5 it must pass through the once per revolution inhibit chain shown in FIG. 6. Initially the trailing edge of an IRG pulse, which indicates that the identification words have been written or that a previous data recording run is completed, causes FF–10 to be transferred or reset. With FF–10 reset, an enabling signal is sent to NAND gate 95, the first of four gates in the once per revolution inhibit chain. A once per revolution signal from the input shaft encoder indicator track is first sent to pulse amplifier PA–4. The amplified signal is then forwarded to delay circuitry 78 where it is held for a sufficient length of time to allow FF–10 to transfer and permits preset counters A and B to reset. The signal is then sent to the now enabled gate 95 and passed to the second NAND gate, 96, in the inhibit chain. Gate 96 is enabled by a level from reset FF–9 indicating that no writing function is now in progress. If the enabling condition for gate 96 is satisfied, the signal is passed to gate 65 which, as previously noted, is enabled by a signal from the motor speed comparator (FIG. 5) when the input spindle is turning at the preset rate.

The gated signal now reaches the final NAND gate in the inhibit chain, gate 97. This final gate is energized by a signal from flip-flop FF–3 which is generated when the flip-flop is transferred by the WRITE COMPLETE chain indicating the ring-of-four has cycled out. As can be seen, four conditions must therefore be met before the once per revolution inhibit chain is satisfied and a pulse passed on to the repeat test counter circuitry. They are: three identification words must be written on tape, an interrecord gap written, the motor speed must be at the desired rate, and no writing in progress. If the once per revolution chain has been satisfied, a pulse is passed to gate 98 in the repeat test circuitry (FIG. 6).

The function of the repeat test circuitry is to allow more than one data record run to be performed on an individual cam. The number of tests desired is preselected by manually setting the repeat counter 100 to the desired number. The repeat test counter 100 consists of a two digit BCD counter, the output of which is connected to a set of AND gates 98 and 99, respectively. The counter is enabled by a signal from pulse amplifier PA–5 which is propagated when the start test button S–2 (FIG. 4) is depressed. Energization of the counter causes a signal to be generated which is sent to AND gate 98 and 99. If the repeat counter output is negative, indicating that the desired count has not been reached, gate 99 is inhibited. However, this negative pulse is inverted by inverter 101 thereby allowing gate 98 to be enabled. Enabled gate 98 allows a once per revolution pulse which has traversed its inhibit chain to pass therethrough. The pulse is amplified by pulse amplifier PA–6 and then sent to flip-flop FF–5 thus placing the flip-flop in a condition to enable the preset counters. The signal from pulse amplifier PA–6 is also used to step the repeat counter and to transfer FF–10. As has been explained transfer of FF–10 again places the system in a condition to accept another once per revolution pulse.

The preset counters A and B are now in a condition to receive signals from the input shaft encoder indicative of the angular displacement of the input spindle. Output data, that is the angular displacement of the cam follower is recorded in response to the angular displacement of the cam. This recording sequence continues until preset counter B reaches the preset count at which time a transfer signal is sent to FF–4 and FF–5. FF–4 transfers to the ONE state and an enabling signal is sent to gate 94 (FIG. 7) causing an IRG command signal to be generated as previously described. The enabling of gate 94 also causes a signal to be passed to gate 99 (FIG. 6) informing it that the data record has been completed. If no more repeat tests are desired of this cam, that is, the repeat counter has reached coincidence, a positive going signal is sent to gate 99 enabling the gate and the signal from gate 94 is allowed to pass to pulse amplifier PA–7. As illustrated in FIG. 4, the output from the PA–7 is used to transfer the states of flip-flops FF–2, FF–3, FF–6, and FF–8 causing the test-complete-light to come on and the torque motor and the drive system sub-assembly to be turned off thus in effect shutting down the test apparatus.

As previously noted, FF–9 (FIG. 7) changes state for each WRITE COMPLETE signal and for each IRG command generated. Since a WRITE COMPLETE signal occurs after each data word, IRG gap, or end-of-tape gap, FF–9 serves the function of making sure that no attempt is made by the system to initiate a data writing cycle until a previous cycle has been completed. As can be seen, after the last desired data record is placed on tape the system causes an interrecord gap to be written. The end-of-tape identification data is then placed by the operator in the BCD coded switches in the same manner as the record identification words. The ring-of-four, at this time, resides in the ONE state and an end-of-tape identification word sequence is initiated by the operator depressing switch S–3 (FIG. 4) which sends an initiating signal directly to the ring-of-four through OR gate 81 (FIG. 8).

When the last identification word is placed on tape, the intercoupler RECORD signal terminates and a WRITE COMPLETE signal is sent to FF–9 transferring it to the ONE state. With FF–9 in the ONE state NAND gate 102 is enabled and the next WRITE COMPLETE signal is allowed to pass therethrough. This WRITE COMPLETE signal is passed to gate 103 which is enabled if FF–6 is in the ONE state indicating that the repeat counter has reached coincidence. If the desired number of test runs on this particular cam have been made and the repeat counter has reached the preset count, gate 103 is enabled and the signal passes to the next gate in the chain. The final gate in this chain, gate 104, is enabled when FF–7 is transferred by depressing the end-of-tape button S–3 (FIG. 4). As can be seen, closure of the end-of-tape button places the system in a state such that it must first be reset before a proper sequence of operations can be performed on the next test cam.

It should be evident that for the system to function properly, the correct sequence of events must have taken place in the various controlled chains. For example, if the once per revolution pulse inhibit chain has not been satisfied, the motor will continue to rotate either until it is manually stopped or until the inhibit chain is somehow satisfied. There are a number of such interlocking features in the system which make it impossible to run a cam test until the proper sequence of operations has been carried out.

The data acquired on tape is then fed to a computer means 75 (FIG. 3) for evaluation. In this particular embodiment in which a rotary encoder is employed, the cam velocity is computed for each sample. That is, the velocity output of the system is simply the difference in displacement of the input spindle per unit of time. By preselection, the time factor is related either directly or through a constant to the actual working conditions that the cam will be subjected to. The differences in output readings are converted in the computer to radiance and the velocity therefore found in radiance per second.

As has been described, the velocity of the input spindle is accurately controlled, i.e., the angular displacement of the input shaft per unit of time is a constant. Through the arrangement of the system, the angular displacement of the input spindle is directly related to the output spindle so that output is measured in reference to a known displacement of the input shaft when the output velocity is computed by the relationship:

$$\frac{d\theta}{dt} = \frac{d\theta}{d\alpha} \frac{d\alpha}{dt}$$

where $d\alpha/dt$ = the input velocity of the input spindle which is held constant $d\theta/d\alpha$ = the rate of change of the output spindle displacement in respect to the controlled displacement of the input spindle.

In a similar manner, the output acceleration and jerk are calculated where required and converted to radiance per second $^2$ and radiance per second,$^3$ respectively. It should be clear from the above relationship that, although the input shaft of the system is being turned at a constant velocity, this method of testing is not necessarily time dependent.

A variety of test methods are available for which the computer may be programmed. A velocity standard deviation method or a position standard deviation method are but two examples by which velocity can be calculated. However, no matter what method of testing is employed, it has been found that a "sliding span" procedure of testing is preferred for evaluating all output parameters. That is, error is found over a span of samples, a span being an intrical number of samples. When this error is calculated the span is moved, or caused to slide over a one sample interval and the procedure repeated until the last sample in the span coincides with the last sample taken. Any error in a particular span is stored at the first sample and the errors are readout along side the first reading in the appropriate span.

It is quite feasible to program the present apparatus to eliminate inherent errors in the mechanical fixture. Since it is very difficult to manufacture a spindle which rotates the cam shaft with extremely small or no runout, a means of compensating for this error can be provided. To this effect, a perfectly circular cam is used. It is known that the disc cam has a runout of no greater than a certain small dimension when mounted on a shaft. This cam is inserted into the fixture and a series of recordings of this disc are made. First of all, the system records the identification data on the tape. The circular cam, is identified by unique numbers so that the computer program will be able to identify it. The system then waits while the cam shaft is rotating until the index pulse and the input shaft encoder incurs. When the once per revolution pulse does occur, pulses are fed to preset counter A. This counter is preset to the number of input shaft pulses which must occur for one sample of the output shaft encoder to be recorded. Thus, whenever this counter reaches its preset count, a pulse is sent to the buffer and the instantaneous position of the output shaft encoder is transferred to the tape recorder. The binary code of the output shaft encoder is frozen for a period of time sufficiently long to assure that no change in the code will take place during the recording interval. At the same time the preset counter A sends a pulse to the buffer, it also sends a pulse to preset counter B which is set to the number of samples which are to be taken over a full test cycle. Thus, if samples are to be recorded over a full revolution of the cam, the product of the setting of the preset counter A and B must be equal to the resolution of the input shaft encoder, in this case 32,400 bits. This sampling and recording process continues until preset count B is reached at which time the control system checks whether more repeat tests for this particular cam are to be performed. If desired, these tests are performed until eventually the system comes to a halt. Any change in radius recorded during the revolution of the circular cam are known to be due to runout problems of one sort or another. This data will be later used in the computer evaluation.

While the invention has been described with reference to the structure disclosed herein, it is not confined to the details set forth, and this application is intended to cover such modifications or changes as may come within the purposes of the improvements or the scope of the following claims.

What is claimed is:

1. Apparatus for measuring and evaluating the output response of a cam system including
   an input spindle for rotatably supporting a cam member therein,
   means to rotate said input spindle,
   input encoder means coupled to said input spindle being capable of detecting the angular displacement of said input spindle,
   means for sensing a predetermined index position of the cam member,
   an output spindle being adapted to support a cam follower therein,
   said output spindle being arranged so that the cam follower communicates with the working face of the cam and moves in response thereto,
   output encoder means coupled to said output spindle to detect instantaneously the response of the cam follower,
   a buffer memory being capable of accepting and storing a coded signal from said output encoder indicative of the cam follower response,
   logic circuitry means for coupling the coded output from said output encoder to said buffer memory in response to the angular displacement of the input spindle from the index position sensed, and
   computer means responsive to data received from said buffer for producing an output indicative of the dynamic output characteristics of the cam system.

2. The apparatus of claim 1 having further tape recording means coupled to said buffer for acquiring a quantity of data prior to the processing of the data by said computer means.

3. The apparatus of claim 1 wherein said input spindle is rotated at a constant velocity.

4. The apparatus of claim 2 wherein said output spindle is movably mounted in relation to said input spindle whereby the cam follower can be moved in and out of communication with the working face of a cam member.

5. Apparatus for measuring and evaluating the output response of a cam system having a cam member and a cam follower including means for rotatably supporting a cam member, input encoder means coupled to said means for supporting the cam member and being capable of detecting the angular displacement of said cam member, members for sensing a predetermined index position of the cam member, means for supporting the cam follower so that the cam follower communicates with the working face of the cam and moves in response thereto, output encoder means coupled to said means for supporting the cam follower for detecting instantaneously the response of the cam follower, a buffer memory being capable of accepting and storing a coded signal from said output encoder indicative of the cam follower response, logic circuitry means for coupling the coded output from said output encoder to said buffer memory in response to the angular displacement of the means for supporting the cam follower from the index position sensed, and computer means responsive to data received from said buffer for producing an output indicative of the dynamic output characteristics of the cam system.

References Cited

UNITED STATES PATENTS

| | | | |
|---|---|---|---|
| 3,147,370 | 9/1964 | Lowman | 235—151.13 XR |
| 3,234,655 | 2/1966 | Skeels et al. | 33—174 |
| 3,245,148 | 4/1966 | Whitney | 33—174 |
| 3,330,159 | 7/1967 | Ongaro | 33—174 XR |
| 3,380,048 | 4/1968 | Sepich et al. | 340—347 |

EUGENE G. BOTZ, Primary Examiner

E. J. WISE, Assistant Examiner

U.S. Cl. X.R.

74—569